United States Patent Office 3,749,710
Patented July 31, 1973

3,749,710
METHOD FOR PREPARING HYDROXYETHYL-HYDROXYBUTYL CELLULOSE
Shunichi Koyanagi, Kinya Ogawa, Yoshiro Onda, Akira Yamamoto, and Hiroshi Suzuki, Naoetsu, Japan, assignors to Shinetsu Chemical Company, Tokyo, Japan
No Drawing. Filed Apr. 13, 1971, Ser. No. 133,753
Claims priority, application Japan, Apr. 27, 1970, 45/36,034
Int. Cl. C08b *11/08*
U.S. Cl. 260—231 A                                8 Claims

ABSTRACT OF THE DISCLOSURE

Cellulose material is reacted with ethylene oxide and butylene oxide in the presence of alkali and water. The hydroxyethylhydroxybutyl cellulose thus obtained is a novel substance which is soluble in cold water and in various polar organic solvents but insoluble in hot water, and superior in compatibility with salts, so that it is useful as a coating material, binder, paint remover, base for paints, emulsifier or polymerizing additive for synthetic resins, thickener and adhesive for ceramics and building boards.

SUMMARY OF THE INVENTION

This invention relates to a method for preparing novel and useful hydroxyethylhydroxybutyl cellulose.

Cellulose ethers of this kind are exemplified by methylcellulose (hereinafter referred to as MC), hydroxyethylcellulose (HEC), hydroxyethyl methylcellulose (HEMC), hydroxypropyl methylcellulose (HPMC), hydroxybutyl methylcellulose (HBMC) and the like, which have merits and demerits in solubility in cold or hot water and in organic solvents, as well as in compatibility with salts, etc., although somewhat varying due to their substitution degrees. Consequently various difficulties have to be met with in refining the products when these cellulose ethers are prepared or when they are employed in various industrial fields.

An object of the invention is to provide a method for preparing a novel cellulose ether free from the faults given above, and another object of the invention is to provide hydroxyethylhydroxybutyl cellulose (hereinafter referred to as HEHBC), which is soluble in cold water but insoluble in hot water, soluble in many polar organic solvents and superior in compatibility with salts.

The objects stated above are found to be attained by reacting cellulose with ethylene oxide and butylene oxide in the presence of alkali and water, and HEHBC prepared by the method of the invention has proved to be represented by the following general formula:

$$R^1_m R^2_n A$$

wherein $R^1$ is a hydroxyethyl group, $R^2$ a hydroxybutyl group, $m$ and $n$ are positive integers and A is a cellulose residue. Especially when the average number of the substituted moles per anhydrous glucose unit in the cellulose (hereinafter referred to as M.S.) is from 0.1 to 2.0 or more preferably from 0.2 to 1.5 in the case of hydroxybutyl groups, and from 1.0 to 3.0, or more preferably from 1.5 to 2.5 in the case of hydroxyethyl groups, the product, HEHBC, will be soluble in cold water but insoluble in hot water. Thus, when it is prepared, unlike in the production of HEC, which is soluble in hot water, no organic solvents will have to be employed, for which a complicated recovery apparatus must be installed, and merely by changing the temperature of the water used as a medium, a product of high purity can be prepared with ease and at low cost. As compared with other known cellulose ethers, such as MC, HEMC, HPMC and HBMC, said HEHBC is soluble in a larger number of polar organic solvents, especially in a single solvent. Therefore it is very useful as a coating material for tablets and pills, a binder for medicines, and a paint-remover. Moreover, its superior compatibility with salts makes it completely free from the fear of gelling in their presence, and provides a variety of applications in various industrial fields, such as a base for paints, an emulsifier for synthetic resins, a polymerizing additive to synthetic resins, a thickener for cosmetics and foods, and an adhesive for ceramics and building boards.

Table 1 shows the gel point, compatibility with sodium chloride, ash content and solubility in organic solvents of many kinds of HEHBC varying in gel point, which were prepared by the method of the invention and of the known cellulose ethers.

It is clear from the table that HEHBC's prepared by the method of the invention, especially those having a gel point of up to 100, are superior in many points to the known cellulose ethers, so that it is advisable to make the gel point of HEHBC prepared by the method of the invention at most 100.

TABLE 1.—PROPERTIES OF CELLULOSE ETHERS

| Sample | HEHBC-1 | HEHBC-2 | HEHBC-3 | HEHBC-4 | HEHBC-5 | HEHBC-6 | HEC | MC | HEMC | HPMC | HBMC |
|---|---|---|---|---|---|---|---|---|---|---|---|
| Substitution: | | | | | | | | | | | |
| HE (MS) | 1.86 | 1.99 | 1.85 | 1.83 | 1.86 | 1.84 | 1.92 | | 0.11 | | |
| HB (MS) | 0.09 | 0.28 | 0.64 | 0.29 | 0.52 | 0.85 | | | | | |
| M (DS) | | | | | | | | | | | 0.03 |
| HP (MS) | | | | | | | | 1.83 | 1.41 | 1.75 | 1.80 |
| Gel point (° C.) | >100 | 81 | 40 | 72 | 59 | 65 | >100 | 52 | 65 | 0.24 | 56 |
| Compatibility with salts (ml.) | >25 | >25 | 5 | 21 | >25 | >25 | >25 | 2 | 9 | 61 | 3 |
| Ash content (percent) | 2.11 | 0.45 | 0.20 | 0.37 | 0.31 | 0.15 | 2.31 | 0.23 | 0.51 | 7 | 0.31 |
| Solubility in: | | | | | | | | | | 0.42 | |
| Methanol | SW | S | S | S | S | S | IS | IS | IS | SW | IS |
| Ethanol | IS | SW | S | SW | S | S | IS | IS | IS | SW | IS |
| Isopropanol | IS | SW | S | SW | S | S | IS | IS | IS | SW | IS |
| Methylene chloride-methanol | SW | S | S | S | S | S | IS | S | SW | S | S |

NOTES:
(A) Abbreviations.—DS=Average number of substituted moles of hydroxy groups in glucose per anhydrous glucose unit; MS=Average number of substituted moles of hydroxy alkyl groups per anhydrous glucose unit; HE=Hydroxyethyl group; HB=Hydroxybutyl group; M=Methoxy group; HP=Hydroxypropyl group.
(B) Methods for measurement.—Gel point=The temperature of a 2% aqueous solution of cellulose ether was raised at the rate of 1.5° to 2° C. per minute, and the temperature at which the solution became gelled was employed to denote the gel point of the cellulose ether. This gel point shows the solubility in hot water of the cellulose ether. Compatibility with sodium chloride=10 ml. of a 1% aqueous solution of cellulose ether was titrated with saturated solution of sodium chloride, and the amount (in ml.) of the latter required for muddying the former was used to denote the compatibility of the sample with sodium chloride. Solubility=A 1% solution of cellulose ether was prepared with methanol, ethanol, isopropanol, or methylene chloride-methanol (1:1). In the table, mark S shows that the sample was soluble in the organic solvents, while mark SW shows that it got swollen in it, and mark IS shows it was insoluble in it.

As mentioned before, the preparation of HEHBC of the present invention is carried out by reacting cellulose with ethylene oxide and butylene oxide in the presence of alkali and water. In practicing the method of the invention, the amounts of butylene oxide and ethylene oxide had better be from 1.5 to 7.5 moles of ethylene oxide and from 0.2 to 10 moles of butylene oxide per mole of anhydrous glucose unit in the cellulose, because then the desired cellulose ether whose M.S. of hydroxybutyl group is from 0.1 to 2.0 and that of hydroxyethyl group is from 1.0 to 3.0 can be prepared with ease. In this case the two reactions can be conducted either simultaneously or after cellulose is first reacted with either ethylene oxide or butylene oxide, the intermediate can be reacted with the other.

These hydroxyalkylations can be carried out (1) by reacting the mixture of alkali, water and cellulose with a hydroxyalkylating agent in the absence of any solvents or (2) by adding to the mixture of alkali, water, and cellulose some water-soluble organic solvent such as isopropanol or tertiary butanol, in which is dispersed a hydroxyalkylating agent so that the reaction of cellulose with the hydroxyalkylating agent may proceed in the liquid phase. Of the two methods, the former has advantages in the use of no solvent so that there will be no need of employing the solvent-recovering apparatus, nor will there be any side reaction taking place between the etherificating agent and the solvent. However, a byproduct given by the polymerization taking place between the etherificating agents may reduce the yield of the product. On the other hand, when the latter method is employed, an inactive solvent such as benzene must be used as a solvent in order to prevent the occurrence of a side reaction between the solvent and the etherificating agent. The choice of the method must be made in consideration of the degree of the purity desired of the product, the production apparatus employed and the yield of the product.

But, if in the first place cellulose is reacted with butylene oxide in the absence of a solvent, and then with ethylene oxide in the presence of a solvent, or if cellulose is reacted either in the presence or absence of a solvent with butylene oxide and a prescribed amount of from 10 to 50% of ethylene oxide, and then the greater part, e.g. from 50 to 90%, of alkali in the system is neutralized, and if necesary, washed with salt and the remaining 90 to 50% of ethylene oxide is reacted in the presence of a little amount of alkali, in either case the compatibility of the product, HEHBC, with salts will not be lowered, even if the M.S. of its hydrobutyl group may be high. Additionally it will be provided with superior insolubility in hot water and solubility in organic solvents, and the etherification by ethylene oxde will be improved. Especially by the second method, the etherification by butylene oxide will also be improved, and the ash content of the product will become small.

Alkali employed in the practice of the invention is exemplified by caustic soda and caustic potash in the ratio of from 5 to 150 parts based on 100 parts of cellulose. It is preferable that from 5 to 300 parts of water based on 100 parts of cellulose are used in conjunction. The etherificating reaction by the method of the invention can be carried out in two stages as given above, in which case the amount of alkali employed in carrying out the second etherification can be as small as from 3 to 30 parts based on 100 parts of cellulose.

When the reaction is to be carried out in the presence of a solvent, it should be employed in an amount by weight of from 0.5 to 20 times that of cellulose. Such a solvent is exemplified by an aliphatic alcohol having from 3 to 5 carbon atoms such as propyl alcohol, amyl alcohol, tertiary butyl alcohol, and isopropyl alcohol, besides acetone, dioxane and tetrahydrofuran.

The reactions had better be carried out at atmospheric pressure or high pressure, or more preferably at the vapor pressure of the hydroxyalkylating agent and the solvent. Of the two reactions, hydroxyethylation is conducted at 10° to 70° C. for 1 to 20 hours, and hydroxybutylation at 50° to 110° C. for 1 to 20 hours. When the two reactions are to be conducted simultaneously, the temperature in the early period is kept at 10° to 70° C. and then it is raised until at least the reaction is finished at 50° to 110° C.

As stated above, by the method of the invention, a novel and useful hydroxyethyl hydroxybutyl cellulose, having a wide use in various industrial fields can be prepared with great ease.

The details of the present invention shall be further described in the following examples, in which parts and percentages are all given by weight.

EXAMPLES 1, 2, AND 3

To 10 parts of pulverized wood pulp were added 50 parts of isopropanol and 2 parts of water to give a slurry, which was stirred at room temperature for 1 hour together with 2 parts of a 30% aqueous solution of caustic soda. Subsequently, it was transferred to a pressure vessel and after ethylene oxide (EO) and butylene oxide (BO) in amounts given in Table 2 were added to it, the vessel was sealed. The mixture was heated and maintained at 30° C. for 2 hours, at 50° C. for 2 hours and at 90° C. for 2 hours, after which the vessel was cooled. Agitation was employed throughout the process. The product thus obtained was neutralized with acetic acid. The one in Example 1 was soluble in hot water, so that in order to remove water, it was first washed with acetone of 80% concentration, and then with acetone of 100% concentration, dried and pulverized. In Examples 2 and 3, the product was neutralized and mixed with hot water to give a slurry, which, after being let to stand still was subjected to decantation in order to remove liquid, washed with hot water 3 or 4 times, and the purified HEHBC was dried and pulverized. M.S., efficiency, yield, gel point, and ash content were as given in Table 2.

TABLE 2

| Example number | 1 | 2 | 3 |
|---|---|---|---|
| Parts per part of dry cellulose: | | | |
| $H_2O$ | 0.40 | 0.40 | 0.40 |
| NaOH | 0.10 | 0.10 | 0.10 |
| EO | 1.01 | 1.07 | 0.99 |
| BO | 0.09 | 0.30 | 0.65 |
| M.S. of HEHBC: | | | |
| HE | 1.86 | 1.99 | 1.85 |
| HB | 0.09 | 0.28 | 0.64 |
| Efficiency (percent): | | | |
| EO | 50 | 51 | 51 |
| BO | 44 | 41 | 44 |
| Cellulose yield (percent) | 88.2 | 97.2 | 98.6 |
| Gel point of 2% aqueous solution (° C.) | 100 | 81 | 40 |
| Ash content (percent) | 2.11 | 0.45 | 0.20 |

NOTE:

$$\text{Efficiency} = \frac{M.S.}{\text{Alkylyeane oxide input in moles per anhydrous glucose unit}} \times 100$$

$$\text{Cellulose yield} = \frac{\text{Amount of cellulose in HEHBC}}{\text{Amount of cellulose in the raw material}} \times 100$$

EXAMPLE 4

To 10 parts of pulverized wood pulp were added 5 parts of a 20% aqueous solution of caustic soda, and after being well mixed, the mixture was transferred to a pressure vessel, and with an addition of 9.8 parts of ethylene oxide, the vessel was sealed. While the mixture was stirred, the reaction was conducted at 30° C. for 2 hours and at 50° C. for 2 hours, after which the temperature of the pressure vessel was lowered to room temperature. The unreacted ethylene oxide was removed while it was replaced by nitrogen. To the reaction product was added 3 parts of butylene oxide, and the reaction was further carried out at 50° C. for 2 hours and at 90° C. for 2 hours. Then the pressure vessel was cooled, the reaction product was neutralized with hydrochloric acid in hot water, and just as in Examples 2 and 3 the product was purified and dried. M.S., efficiency, yield, gel point, and ash content were as given below.

| | |
|---|---|
| M.S. hydroxyethyl group | 1.83 |
| M.S. hydroxybutyl group | 0.29 |
| Efficiency of ethylene oxide (percent) | 51 |
| Efficiency of butylene oxide (percent) | 43 |
| Cellulose yield (percent) | 97.7 |
| Gel point (° C.) | 72 |
| Ash content (percent) | 0.37 |

EXAMPLE 5

To 10 parts of pulverized wood pulp were added 5 parts of a 20% aqueous solution of caustic soda, and after well mixed, the mixture was transferred to a pressure vessel and 7.5 parts of butylene oxide were added to it. The vessel was sealed and while the mixture was stirred, the reaction was carried out at 50° C. for 2 hours and at 90° C. for 2 hours, after which the temperature of the vessel was lowered to room temperature. The unreacted butylene oxide was removed while it was replaced by nitrogen. To the reaction product were added 7.6 parts of ethylene oxide and the reaction was further carried out at 30° C. for 2 hours and at 50° C. for 2 hours. Then the pressure vessel was cooled, the reaction product was neutralized with hydrochloric acid in hot water, and just as in Example 4, the product was purified and dried. M.S., efficiency, yield, gel point, and ash content were as given below.

| | |
|---|---|
| M.S. of hydroxyethyl group | 1.86 |
| M.S. of hydroxybutyl group | 0.52 |
| Efficiency of ethylene oxide (percent) | 67 |
| Efficiency of butylene oxide (percent) | 39 |
| Cellulose yield (percent) | 98.0 |
| Gel point (° C.) | 59 |
| Ash content (percent) | 0.31 |

EXAMPLE 6

10 parts of pulverized linter pulp flock were well dispersed in 100 parts of tertiary butanol, and with an addition of 20 parts of aqueous caustic soda of 20% concentration, the mixture was stirred and put in a pressure vessel. 3 parts of ethylene oxide and 7.5 parts of butylene oxide were added to the slurry and the reaction was carried out at 60° C. for 1 hour and at 90° C. for 2 hours. After the temperature of the vessel was lowered to room temperature, 80% of alkali in the system was neutralized with aqueous hydrochloric acid. 5.0 parts of ethylene oxide were added to the slurry, and the mixture was reacted at 60° C. for 2 hours and at 90° C. for 2 hours. The temperature of the vessel was once more lowered to room temperature and the remaining alkali was neutralized with aqueous hydrochloric acid like the one described above, and the product was purified, dried and pulverized just as in Examples 2 and 3. HEHBC prepared proved to have the following properties.

| | |
|---|---|
| M.S. of hydroxyethyl group | 1.84 |
| M.S. of hydroxybutyl group | 0.85 |
| Efficiency of ethylene oxide (percent) | 62 |
| Efficiency of butylene oxide (percent) | 50 |
| Cellulose yield (percent) | 98.5 |
| Gel point (° C.) | 65.0 |
| Ash content (percent) | 0.15 |

What is claimed is:

1. The method for preparing hydroxyethylhydroxybutyl cellulose which comprises reacting cellulose with ethylene oxide and butylene oxide in the presence of from 5 to 150 parts of alkali and from 5 to 300 parts of water, both based on 100 parts of the cellulose, thereby obtaining hydroxyethylhydroxybutyl cellulose having general formula $R^1_m R^2_n A$, wherein $R^1$ is a hydroxyethyl group, $R^2$ a hydroxybutyl group, $m$ and $n$ are positive integers and $A$ is a cellulose residue, in which the average number of substituted moles of hydroxyalkyl groups per anhydrous glucose unit is from 0.1 to 2.0 in the case of hydroxybutyl group and from 1.0 to 3.0 in case of hydroxyethyl group.

2. The method claimed in claim 1, wherein said reaction is conducted in the presence of (i) from 5 to 150 parts of alkali and from 5 to 300 parts of water, both based on 100 parts of the cellulose and (ii) an organic solvent from 0.5 to 20 times the amount by weight of the cellulose.

3. The method claimed in claim 1, wherein the cellulose is reacted simultaneously with ethylene oxide and butylene oxide at 10° to 70° C. in the first place and subsequently at 50° to 110° C.

4. The method claimed in claim 1, wherein the cellulose is reacted with ethylene oxide at 10° to 70° C. in the absence of an organic solvent and subsequently with butylene oxide at 50° to 110° C. in the presence of an organic solvent.

5. The method claimed in claim 1, wherein the cellulose is reacted with butylene oxide in the absence of an organic solvent and subsequently with ethylene oxide in the presence of an organic solvent.

6. The method claimed in claim 1, wherein the cellulose is reacted with butylene oxide and from 10 to 50% of a prescribed amount of ethylene oxide in the presence of alkali and water and either in the presence or absence of an organic solvent, and after the greater parts of the alkali is neutralized, the intermediate product is reacted with the remaining 90 to 50% of ethylene oxide.

7. Hydroxyethylhydroxybutyl cellulose of the formula $$R^1_m R^2_n A$$

wherein
$R^1$ is hydroxyethyl,
$R^2$ is hydroxybutyl,
A is a cellulose residue, and
$m$ and $n$ are positive integers
and wherein the average number of substituted moles of hydroxyalkyl groups per anhydrous glucose unit is from 0.1 to 2.0 in the case of hydroxybutyl group and from 1.0 to 3.0 in case of hydroxyethyl group.

8. The compound of claim 7 which possesses a gel point not exceeding 100° C.

References Cited

UNITED STATES PATENTS

| | | | |
|---|---|---|---|
| 3,251,824 | 5/1966 | Battista | 260—232 |
| 3,336,291 | 8/1967 | Patton et al. | 260—231 |
| 2,572,039 | 10/1951 | Klug et al. | 260—231 |
| 3,131,176 | 4/1964 | Klug | 260—231 |
| 3,296,247 | 1/1967 | Klug | 260—231 |

DONALD E. CZAJA, Primary Examiner

R. W. GRIFFIN, Assistant Examiner

U.S. Cl. X.R.

106—169, 197 R